ial application Mar. 30, 1959, Ser. No. 802,616, now Patent No. 3,083,191, dated Mar. 26, 1963. Divided and this application Feb. 4, 1963, Ser. No. 256,096
11 Claims. (Cl. 260—79.5)

This invention relates to the new and useful polymer compositions and method of preparing said compositions. In one aspect it relates to polymer compositions containing terminal reactive groups prepared by polymerizing a conjugated diene alone or in admixture with a copolymerizable vinylidene monomer in the presence of a diazothioether. In another aspect the invention relates to polymer compositions obtained by further reacting the terminally reactive polymers with a polyfunctional organic compound.

This is a divisional application of our copending application Ser. No. 802,616 filed Mar. 30, 1959, now U.S. Patent 3,083,191.

As used herein the term "terminally reactive polymer" designates polymer which contains a reactive group at each end of the polymer chain.

As used herein the term "polyfunctional organic compound" designates a compound which is capable of reacting with at least two reactive terminal groups.

It is an object of this invention to provide new and useful polymeric materials and process for their preparation.

Another object of this invention is to provide terminally reactive polymers having improved properties.

Still another object of this invention is to provide polymers having improved properties prepared by reacting terminally reactive polymeric materials with a polyfunctional compound.

These and other objects of the invention will become more readily apparent from the following detailed description and discussion.

The foregoing objects are realized broadly by preparing polymers by emulsion polymerization in the presence of a diazothioether and recovering a terminally reactive polymer.

In one aspect of the invention the terminally reactive polymers are reacted with a polyfunctional organic compound to obtain improved polymers.

In still another aspect of the invention reaction of the terminally reactive polymer with the polyfunctional compound is carried out in the presence of a conventional curing system.

It has now been discovered that new and useful polymeric materials can be prepared by the emulsion polymerization of polymerizable monomers in the presence of diazothioethers to polymers which contain reactive groups at the ends of the polymer chain and double bonds within the polymer chain. It has also been discovered that new and useful polymers can be obtained by reacting the terminally reactive polymer with an organic polyfunctional compound.

The term "emulsion" as used herein is to be construed in its broadest sense, that is, as denoting the presence of an aqueous phase and an oil phase without regard to the extent of dispersion of one in the other. Emulsion polymerization is carried out in an aqueous dispersion, that is, the monomers are dispersed in water, usually with the aid of a dispersing or emulsifying agent and agitation. Emulsifying agents which are suitable for this purpose include partially or completely neutralized fatty acid soaps, sodium lauryl sulfate, sodium isobutylnaphthalene sulfonate, sulfated and sulfonated succinic esters and the like.

The monomers which can be employed in the preparation of the terminally reactive polymers of this invention include the conjugated dienes, preferably those containing from 4 to 12 carbon atoms and more preferably those containing from 4 to 8 carbon atoms. Illustrative examples of suitable conjugated dienes are 1,3-butadiene, isoprene, piperylene, methylpentadiene, 2,3-dimethyl-1,3-butadiene, phenylbutadiene, 3,4-dimethyl-1,3-hexadiene, 4,5-diethyl-1,3-octadiene, etc. In addition conjugated dienes containing reactive substituents along the chain can also be employed, such as for example, halogenated dienes, such as chloroprene, etc. Of the conjugated dienes the preferred material is butadiene, with isoprene and piperylene also being especially suitable. In addition to homopolymers of conjugated dienes the polymers of the invention also include copolymers of conjugated dienes with copolymerizable vinylidene monomers. Comonomers which can be employed are aryl-substituted olefins such as styrene, various alkyl styrenes, paramethoxystyrene, vinylnaphthalene, vinyltoluene and the like; heterocyclic nitrogen-containing monomers such as pyridine derivatives and quinoline derivatives containing at least one vinyl or alpha methyl vinyl group such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and di-substituted alkenyl pyridines and like quinolines; acrylic acid esters such as methyl acrylate, ethyl acrylate; alkacrylic acid esters such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.; monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The diazothioethers which are employed in carrying out the invention are selected from those materials having the formula

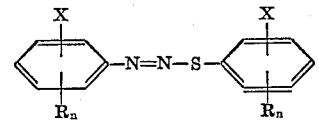

where X is a carboalkoxy radical, each X contains not more than 10 carbon atoms and X's can be like or unlike; R is an alkyl group containing from 1 to 3 carbon atoms an $n$ is an integer from 0 to 2. Some examples of diazo ethers which can be employed are ([4-carbethoxyphenyl] azo) 2-carbmethoxyphenyl thioether; ([4-nitro-2, 3-di-n-propylphenyl] azo) 2 - ethyl - 4-carbnonoxyphenyl thioether; ([2-methyl-3-ethyl-4-carboxyphenyl] azo) 4-caprylphenyl thioether; and ([2-chlorophenyl] azo) 4-n-propyl-3-carbnonoxyphenyl thioether. These compounds can be obtained by diazotizing a suitable aromatic amine and coupling the diazotized amine with the desired substituted phenyl mercaptan (thiophenol).

The diazothioether compound initiates and modifies the polymerization reaction whereby the X radical becomes attached to each end of the polymer chain. it is also within the scope of the invention to convert the X groups at each end of the polymer chain to other X groups, for example, hydrolyzing ester end groups to carboxyl end groups. The general reaction can be illustrated graphically as follows:

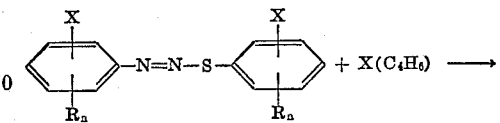

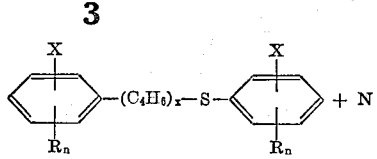

The type and amount of diazothioether used will depend upon the desired molecular weight and the desired reactive end groups in the final polymer composition. Generally in the range of between about 0.05 and about 5.0 parts by weight of diazothioether is employed per 100 parts of the monomer or monomers present. In addition the type of diazothioether and emulsifying agents employed will determine the optimum pH of the reaction mixture. Usually a pH of from about 4 to 12 is desired. Preparation of the terminally reactive polymer is generally carried out at a temperature in the range of between about 10 and about 175° F. and preferably from about 40 to about 140° F. The particular temperatures employed will depend both on the monomers and the initiators used in preparing the polymers. In a preferred method of operation the diazothioether will serve both as the initiator and the modifier although in some cases a supplemental initiator can be used; however, auxiliary modifiers should not be used. It is within the scope of the invention to charge the diazothioether incrementally to the reaction or all of this material can be added before polymerization.

In accordance with one aspect of this invention the terminal reactive polymers prepared with the diazothioethers are reacted with or coupled by means of an organic polyfunctional compound. The polymers of this invention contain two terminal reactive groups, therefore the preferred polyfunctional compounds are those which are bifunctional, namely containing two functional groups. In general polyfunctional alcohols, acids, halides, amines, ketones, diisocyanates, and the like are employed. The organic radicals of the organic polyfunctional compounds are preferably selected broadly from aliphatic, cycloaliphatic and aromatic hydrocarbon radicals. The reaction with polyfunctional compounds can be illustrated by the following specific example:

listed acids, methylene chloride, 1,2-dibromoethane, 1,4-dichlorobutane, dibromobenzene, 4-bromobenzyl bromide, dichlorocyclohexane, 1,4-dichloronaphthalene, ethylenediamine, pentamethylenediamine, 1,8-diamino-3-octene, 1,4-diaminobenzene, 1,3-diaminocyclohexane, 4-aminobenzylamine, 1,4-diaminoaphthalene, 4-(amino-ethyl)aniline, hydroquinone, 1,4-bis(acetyl)butane, 1,5-bis(propionyl)pentane, 1,4-bis(acetyl)cyclohexane, alpha, alpha'-bis(acetyl) xylene, butane-1,4-diisocyanate, octane-1,8-diisocyanate, cyclohexane-1,4-diisocyanate, benzene-1,4-diisocyanate, butane-1,4-disulfonic acid, hexane-1,6-disulfonic acid, decane-1,10-disulfonic acid, cyclohexane-1,4-disulfonic acid, benzene-1,4-disulfonic acid, 1,4-di(sulfoethyl)benzene, 2-(3-sulfophenyl)propane sulfonic acid, hydrazides of mercapto-substituted aliphatic acids preferably containing from 2 to 30 carbon atoms, such as 2-mercaptoacetohydrazide, 3-mercaptovalerohydrazide, 5-mercaptocaprohydrazide, 10-mercaptomyristohydrazide, 18-mercaptoarachiodohydrazide and 12-mercaptostearohydrazide, semicarbazides and thiosemicarbazides containing from 1 to 10 carbon atoms such as semicarbazide, thiosemicarbazide, 1-phenylsemicarbazide, 2-phenylthiosemicarbazide, 2-ethylsemicarbazide, 2-n-decylthiosemicarbazide, 4-n-butylsemicarbazide, 4-n-butyl-2-ethylthiosemicarbazide, and the like.

In connection with the semicarbazides, an aldehyde containing from 1 to 7 carbon atoms, inclusive, is employed. Some examples of suitable aldehydes include formaldehyde, acetaldehyde, propionaldehyde, enanthaldehyde, furaldehyde, benzaldehyde, and the like. The amount of aldehyde can vary but is usually between about 1.5 and about 10 mols per mol of semicarbazide.

In addition to the foregoing it is within the scope of the invention to react the terminally reactive polymer with a like or unlike terminally reactive polymer having different reactive groups as typified by the following specific reaction.

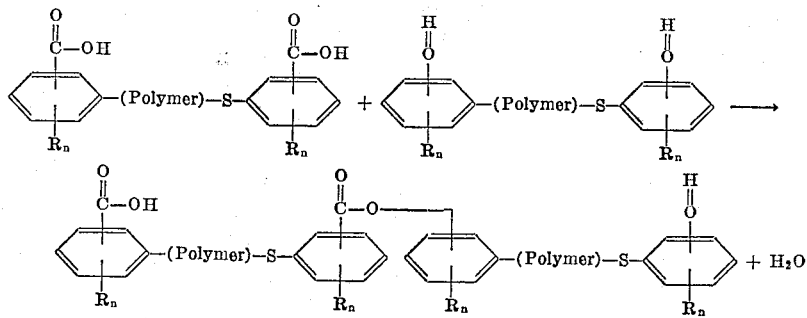

Reaction of the terminally reactive polymer with the polyfunctional organic compounds can be carried out over a range of temperature generally between about −100 and about +350° F. and more usually between about 0

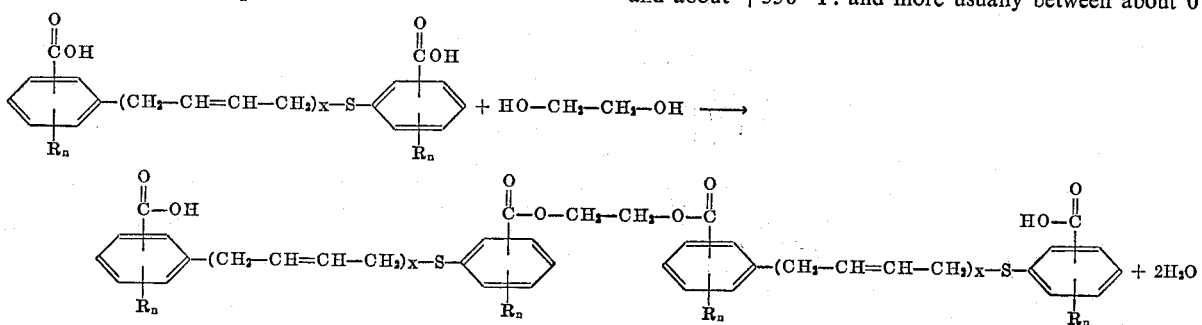

Examples of specific polyfunctional compounds which can be employed are: ethylene glycol, propylene glycol, decylene glycol, dihydroxybenzene, dihydroxycyclohexane, 1,4-di(hydroxyethyl)benzene, glycerol, 1,2,3-trihydroxybutane, erythritol, mannitol, aminophenol, pyrocatechol, resorcinol, pyrogallol, oxalic acid, malonic acid, succinic acid, adipic acid, sebacic acid, phthalic acid (o, m and p), cyclohexane dicarboxylic acid, pyridine dicarboxylic acid, naphthalic acid, fumaric acid, the anhydrides of the above and about 250° F. The time employed in carrying out the reaction will vary depending upon the particular materials being reacted and is usually less than two hours. The quantity of polyfunctional organic reactant employed in carrying out the reaction is usually between about 0.5 to 1 and about 5 to 1, equivalents based on the original diazothioether charge. The reaction mechanism comprises reaction of the polyfunctional organic compound with functional groups at the ends of the polymer chain and with the double bond and/or other functional groups within the polymer molecules. For example, cross-linking of polymer molecules containing terminal groups (carboalkoxy) by means of hydrazides of mercapto-substituted aliphatic acids can be carried out in which the hydrazide group reacts with a terminal group on a polymer chain while the mercapto group reacts with a double bond within the same or another polymer chain.

The amount of polyfunctional organic compound employed will depend on the desired degree of cross-linking and upon the molecular weight of the polymer containing the terminal reactive groups. It is preferred that the terminally reactive polymer be of the molecular weight of from 5000 to 20,000 before addition of the polyfunctional compound; however, it is within the scope of the invention to utilize polymers of much higher molecular weight. The reaction of the polyfunctional organic compound and the terminally reactive polymer can be carried out in the presence of conventional curing agents or curing system. Various curing agents can be employed for this purpose depending on the polymers which are being treated, including the peroxides such as benzoyl peroxide and dicumyl peroxide, ultraviolet and ionizing radiation, in systems employing sulfur in conjuncton with other agents, including vulcanization accelerators such as tetramethylthiuram disulfide, benzothiazyl disulfide, mercaptobenzothiazole, thiocarbanilide, N-cyclohexyl-2-benzothiazylsulfenamide, N,N - dimethyl-S-tert-butylsulfenyl dithiocarbamate, and including such accelerator activators as magnesium or zinc oxide in conjunction with fatty acids, zinc stearate, magnesium stearate and the like. When a curing system is employed the reaction can be carried out over a time period of from 10 minutes to as long as 48 hours at from 125 to 375° F., the longer times being used at the lower temperatures. The use of conventional compounding agents such as fillers, pigments, such as carbon black, reinforcing agents, plasticizers and the like is within the scope of this invention.

The terminally reactive polymers of this invention are characterized by their high molecular weights and also by the wide range of molecular weight which can be obtained. Thus, these polymers can be prepared with molecular weights ranging from about 5000 to as high as 150,000 or higher. The polymers which are solids find various uses, a major use being in the preparation of polymers by reaction with polyfunctional compounds, heating, curing, etc. The polymers of this invention vary widely in their properties depending on the particular monomers and mixtures of monomers utilized in their preparation. Many of the polymers are tough, rubbery materials and others are highly elastic. Depending on their particular properties they find wide application in the preparation of molded articles such as tires and other rubber articles; in some cases they can be extruded, calendered and otherwise treated as conventional plastics.

The following example is presented in illustration of the invention.

EXAMPLE

A series of runs were carried out in which terminally reactive polymers containing terminal ester groups were prepared.

Methyl thiosalicylate was prepared by passing anhydrous HCl through a refluxing solution of o-mercaptobenzoic acid in methanol. Mercaptan analysis of the middle fraction (B.P. 118–125 at 3–4 mm. Hg absolute) showed the purity to be 98.8 percent. Ethyl p-aminobenzoate was prepared by refluxing a mixture of p-aminobenzoic acid in ethanol which was saturated with anhydrous HCl. This ester was then diazotized and coupled with methyl thiosalicylate to form methyl ([4-carbethoxyphenyl]azo) 2-carbethoxyphenyl thioether. This compound was then used as the initiator-modifier in several emulsion polymerization runs.

In these polymerization runs some runs were made using only the diazothioether as the initiator while in some of the runs, a supplemental initiator was employed. These runs were carried out according to the following recipe.

Polymerization recipe

| Ingredient: | Parts by weight |
|---|---|
| Butadiene | 75 |
| Styrene | 25 |
| Water | 180 |
| Potassium fatty acid soap (KFA) | 0 or 5 |
| Sodium lauryl sulfate | 0 or 5 |
| Diazothioether (DTE) | Variable |
| $Na_3PO_4$ | Variable |
| $NaH_2PO_4$ | Variable |
| $K_3Fe(CN)_6$ | Variable |
| Temperature, ° C. | 50 (122° F.) |
| Time, hours | Variable |

The results of the runs made according to this recipe are expressed below as Table I.

TABLE I

| Run No. | KFA, Parts | Sodium Lauryl Sulfate, Parts | DTE, Parts | $Na_3PO_4$ Parts | $Na_2HPO_4$ Parts | $NaH_2PO_4$ Parts | $K_3Fe(CN)_6$ Parts | Time, Hours | pH | Conversion, Percent |
|---|---|---|---|---|---|---|---|---|---|---|
| 1 | 5 | 0 | 1 | | | | | 19 | | 24 |
| 2 | 5 | 0 | 2 | | | | | 19 | | 24 |
| 3 | 5 | 0 | 4 | | | | | 19 | | 27 |
| 4 | 5 | 0 | 4 | | | | 0.4 | 19 | | 16 |
| 5 | 0 | 5 | 2 | 2.5 | | | | 19 | 11.8 | 4 |
| 6 | 0 | 5 | 2 | | 2.5 | | | 19 | 9.4 | 20 |
| 7 | 0 | 5 | 2 | | | 2.5 | | 19 | 5.2 | 53 |
| 8 | 0 | 5 | 2 | | | | 0.4 | 19 | | 22 |
| 9 | 0 | 5 | 2 | | | | | 19 | | 21 |
| 10 | 0 | 5 | 2 | 1.0 | | | | 97 | | 36 |
| 11 | 0 | 5 | 2 | 0.8 | | 0.2 | | 97 | | 67 |
| 12 | 0 | 5 | 2 | 0.6 | | 0.4 | | 97 | | 61 |
| 13 | 0 | 5 | 2 | 0.4 | | 0.6 | | 97 | | 60 |
| 14 | 0 | 5 | 2 | 0.2 | | 0.8 | | 97 | | 64 |
| 15 | 0 | 5 | 2 | | | 1.0 | | 97 | | 67 |

Another series of runs was made in which ([4-carbethoxyphenyl]azo) 2-carbmethoxyphenyl thioether was employed as the initiator-modifier in an emulsion polymerization of butadiene. The recipe for these runs was as follows:

Recipe

| Ingredient: | Parts by weight |
|---|---|
| Butadiene | 100 |
| Water | 100 |
| Sodium lauryl sulfate | 5 |
| Diazothioether | 8 |
| $NaH_2PO_4$ | 1 |
| Temperature, ° C. | 50 |
| Time, hours | 30.25 |

Di-tert-butyl hydroquinone was added to each of the reaction bottles in the amount of 0.2 part by weight of monomer to shortstop the reaction. Two percent by weight, based on the polymer, of phenyl-beta-naphthylamine was then added to each of the reaction mixtures. An amount of saturated aqueous NaCl solution was then added to each bottle to cream the polymer present, after which the polymer in each bottle was coagulated by adding isopropyl alcohol. The precipitated polymer was then washed with water several times, followed by an isopropyl alcohol wash, followed by a final wash with a 2 percent by weight solution of phenyl-beta-naphthylamine in isopropyl alcohol. The polymer was then dried in an air oven at 60° C.

The conversion in this run was 35 percent, and the polymer after coagulation as described in Example I was gel free and had an inherent viscosity of 0.57. A sample of this polymer was subjected to infrared scanning after first reprecipitating the polymer six times from benzene solution with isopropyl alcohol. The infrared scanning confirmed the presence of ester groups.

Inherent viscosity was determined as follows: One tenth gram of polymer was placed in a wire cage made from 80 mesh screen and the cage was placed in 100 ml. of toluene contained in a wide-mouth 4-ounce bottle. After standing at room temperature (approximately 25° C.) for 24 hours, the cage was removed and the solution was filtered through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample. In instances where the polymer was of low molecular weight (inherent viscosity below 0.5), a 0.3 gram sample was used for the determination instead of 0.1 gram.

Having thus described the invention by providing specific examples thereof it is to be understood that no undue limitations or restrictions are to be drawn by reason thereof and that many variations and modifications are within the scope of the invention.

We claim:
1. A process which comprises preparing a polymer selected from the group consisting of homopolymers of conjugated dienes and copolymers of conjugated dienes with vinylidene compounds by emulsion polymerization at a temperature in the range of about 10 to 175° F. in the presence of about 0.05 to 5 parts by weight per 100 parts of monomer of a diazothioether having the formula

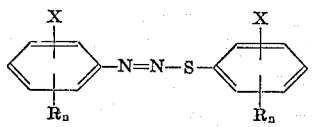

wherein each X is a carboalkoxy radical containing not more than 10 carbon atoms; R is an alkyl group containing from 1 to 3 carbon atoms and $n$ is an integer from 0 to 2, and in the absence of auxiliary modifiers, reacting said polymer at a temperature above —100° F. with about 0.5 to 5 equivalents of a polyfunctional organic compound selected from the group consisting of polyfunctional alcohols, amines, hydrazides of mercapto-substituted aliphatic acids, semicarbazides, and thiosemicarbazides capable of reacting with X and recovering a polymer product.

2. The process of claim 1 wherein said reacting of the polymer and polyfunctional organic compound is carried out in the presence of a conventional curing system.

3. The process of claim 1 in which the polymer is a homopolymer of butadiene.

4. The process of claim 1 in which the polymer is a homopolymer of isoprene.

5. The process of claim 1 in which the polymer is a copolymer of butadiene and styrene.

6. A polymer prepared by the process of claim 1.

7. A process which comprises preparing a polymer selected from the group consisting of homopolymers of conjugated dienes and copolymers of conjugated dienes with vinylidene compounds by emulsion polymerization at a temperature of about 10 to 75° F. in the presence of about 0.05 to 5 parts by weight per 100 parts of monomers of ([4-carbethoxyphenyl]azo) 2-carbmethoxyphenyl thioether and in the absence of auxiliary modifiers, reacting said polymer with between about 0.5 and about 5 equivalents of a polyfunctional organic compound selected from the group consisting of amines, hydrazides of mercapto-substituted aliphatic acids, semicarbazides, and thiosemicarbazides capable of reacting with the carboalkoxy groups in said polymer at a temperature of about —100 to 350° F., and recovering a polymer product.

8. A process which comprises preparing a polymer of butadiene by emulsion polymerization at a temperature of from about 10 to 175° F. in the presence of between about 0.05 and about 5.0 parts by weight per 100 parts of said comonomers of ([4-carbethoxyphenyl]azo) 2-carbmethoxyphenyl thioether and in the absence of auxiliary modifiers, reacting said polymer with between about 0.5 and about 5 equivalent of 12-mercaptostearohydrazide based on the ([4-carbethoxyphenyl]azo) 2-carbmethoxyphenyl thioether at a temperature of between about —100 and about 350° F. and recovering a polymer product.

9. A polymer prepared by the process of claim 8.

10. A process which comprises preparing a copolymer of butadiene and styrene by emulsion polymerization at a temperature of from about 10 to 175° F. in the presence of between about 0.05 and about 5.0 parts by weight per 100 parts of said comonomers of ([4-carbethoxyphenyl]azo) 2-carbmethoxyphenyl thioether and in the absence of auxiliary modifiers, reacting said polymer with between about 0.5 to 5 equivalents of 12-mercaptostearohydrazide based on the ([4-carbethoxyphenyl]azo) 2-carbmethoxyphenyl thioether at a temperature in the range of between about 125 and about 375° F. in the presence of a conventional curing system comprising sulfur and recovering a polymer product.

11. A polymer prepared by the process of claim 10.

References Cited

UNITED STATES PATENTS 2,501,692  3/1950  Reynolds et al. _____ 260—94.4
3,135,716  6/1964  Uraneck et al. _____ 260—85.1

OTHER REFERENCES

Bamford et al., Nature, vol. 176 No. 4471, July 9, 1955, p. 78. Copy in Scientific Lib.

JAMES A. SEIDLECK, *Primary Examiner.*